Figure 1:
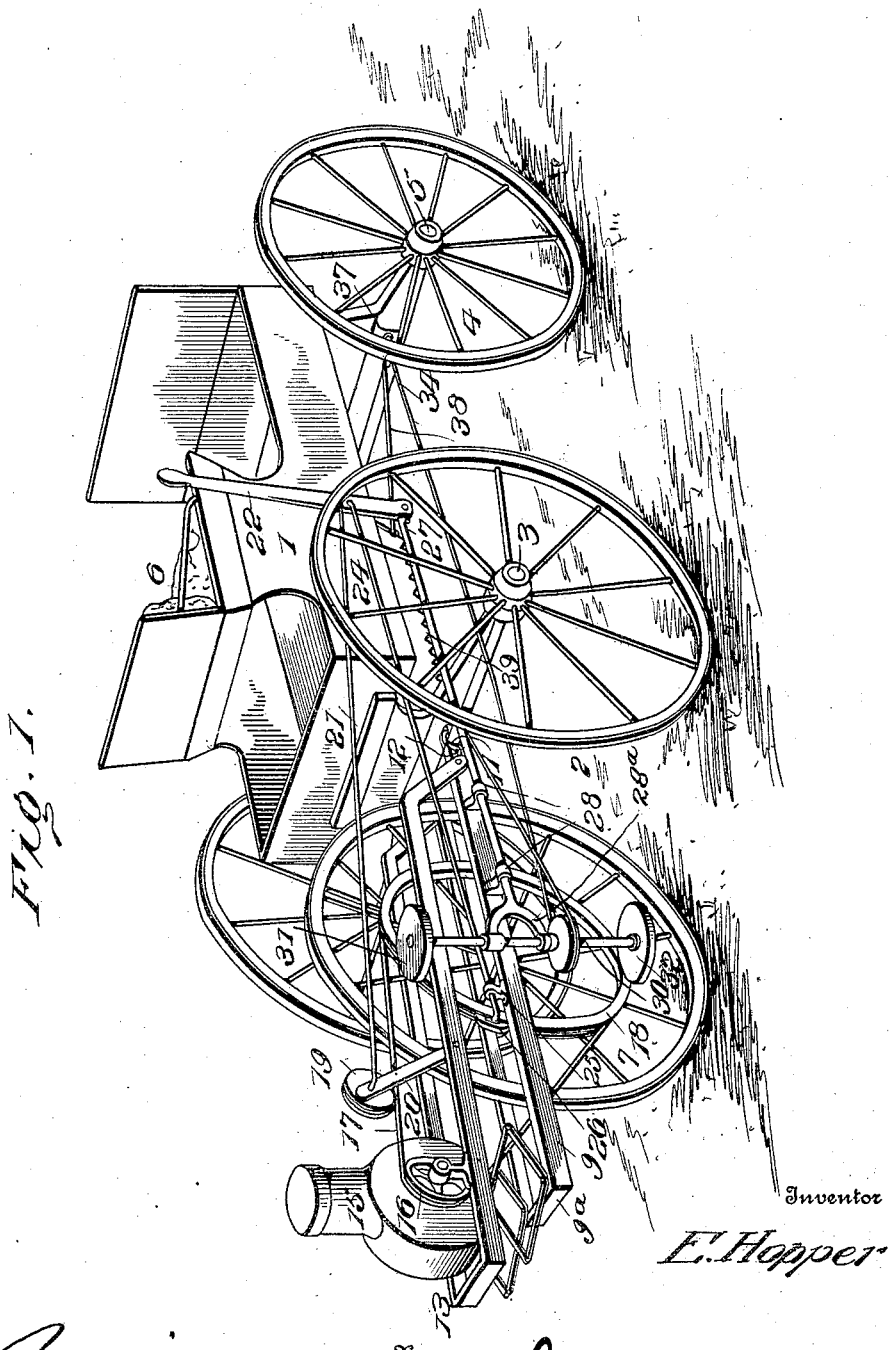

No. 860,603. PATENTED JULY 16, 1907.
E. HOPPER.
MOTOR ATTACHMENT FOR VEHICLES.
APPLICATION FILED APR. 11, 1907.

3 SHEETS—SHEET 1.

Witnesses

Inventor
E. Hopper
By R. S. & A. B. Lacey, Attorneys

No. 860,603. PATENTED JULY 16, 1907.
E. HOPPER.
MOTOR ATTACHMENT FOR VEHICLES.
APPLICATION FILED APR. 11, 1907.
3 SHEETS—SHEET 2.
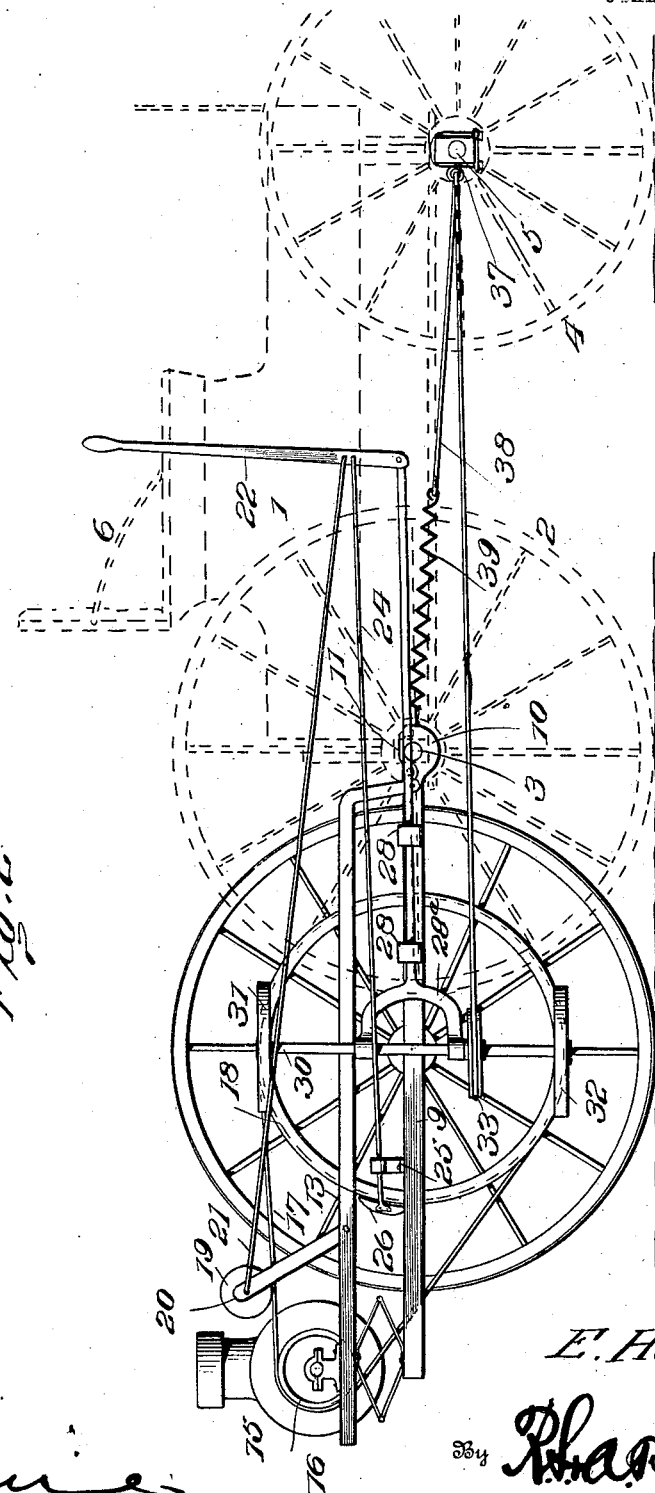
Witnesses
Inventor
E. Hopper
By R.S.&A.B.Lacey,
Attorneys No. 860,603. PATENTED JULY 16, 1907.
E. HOPPER.
MOTOR ATTACHMENT FOR VEHICLES.
APPLICATION FILED APR. 11, 1907.
3 SHEETS—SHEET 3.
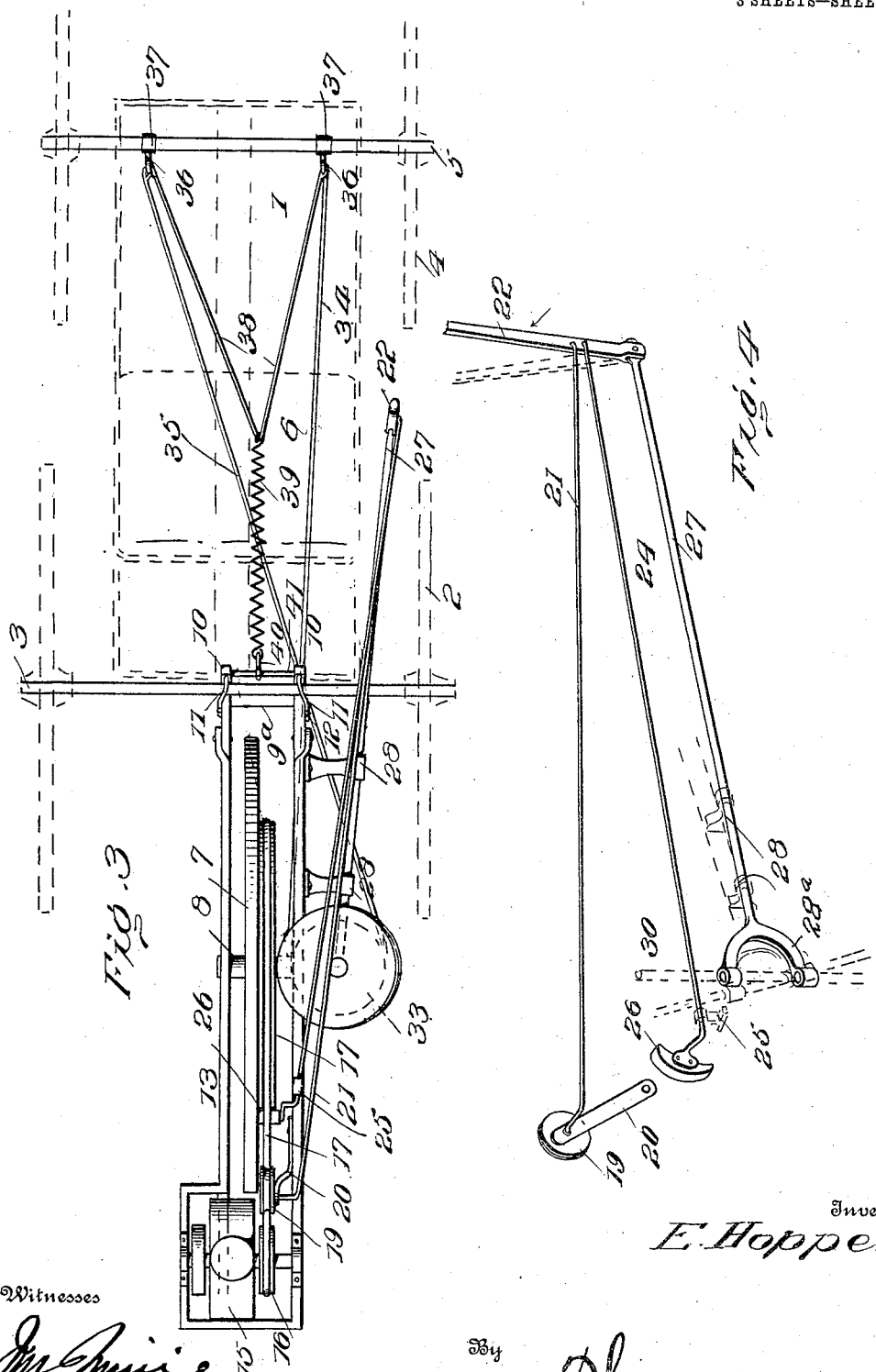
Witnesses
Inventor
E. Hopper
By
Attorneys

UNITED STATES PATENT OFFICE.

EMORY HOPPER, OF FAYETTE, ILLINOIS, ASSIGNOR OF ONE-HALF TO LEWIS STUBBLEFIELD, OF BEECHER CITY, ILLINOIS.

MOTOR ATTACHMENT FOR VEHICLES.

No. 860,603.   Specification of Letters Patent.   Patented July 16, 1907.

Application filed April 11, 1907. Serial No. 367,678.

*To all whom it may concern:*

Be it known that I, EMORY HOPPER, a citizen of the United States, residing in the county of Fayette and State of Illinois, have invented certain new and useful Improvements in Motor Attachments for Vehicles, of which the following is a specification.

This invention comprehends an improved construction of motor attachment for buggies and other vehicles, and the invention has for its object an attachment of this character which will be simple in construction, light, durable, and efficient in operation, and one which may be easily attached to any conventional type of vehicle as a substitute for horses so as to transform a buggy or the like into a self propelled vehicle.

The invention consists essentially in a unicycle motor driven attachment adapted to be connected to the rear axle of an ordinary vehicle to propel the same, and the invention further consists in certain constructions, arrangements, and combinations of the parts which I shall hereinafter fully describe and then point out the novel features in the appended claims.

For a full understanding of the invention and the merits thereof and also to acquire a knowledge of the details of construction of the means for effecting the result, reference is to be had to the following description and accompanying drawings, in which:

Figure 1 is a perspective view showing the application of my improved motor attachment for vehicles; Fig. 2 is a side elevation thereof with the vehicle in dotted lines; Fig. 3 is a top plan view; and, Fig. 4 is a detail perspective view of the hand lever and the parts which it actuates.

Corresponding and like parts are referred to in the following description and indicated in all the views of the drawings by the same reference characters.

Referring to the drawings which illustrate a conventional type of buggy to which my invention is applied, 1 designates the body of the vehicle, 2 the rear traveling wheels journaled on the rear axle 3, 4 the front or steering wheels on the axle 5, and 6 the seat.

My invention comprises a single tractor wheel 7 preferably of the tension spoke type, which is journaled on the axle 8 extending transversely of the comparatively narrow framework embodying spaced longitudinal bars 9 connected by cross bars 9ª: The framework is adapted to be coupled to the rear axle of the vehicle at the middle thereof, so that the propelling wheel 7 may travel at the rear of the vehicle in the middle of the road; and to this end, the said bars 9 are provided with forwardly extending and upwardly facing hooks 10 adapted to take under the rear axle 3 and be detachably clamped thereto by means of spring clamps 11 connected to the hooks and extending over the axle with their rear ends caught underneath laterally projecting pins 12 on the side bars 9. The pins 12 also serve as the pivot points for a motor supporting frame 13, the side bars of which extend upwardly and thence rearwardly above the side bars 9 and which are secured near their rear ends to the said side bars 9 by a spring structure, such as the bow springs illustrated in the drawings, in order to permit the motor to yield.

The motor may be either an electric motor, gasolene engine, or a prime mover of any character, a conventional form being shown for the purpose of illustration only, designated 15.

On the driving shaft of the motor is the drive pulley 16 which is connected by the belt 17 with the grooved disk 18 secured to the propulsion wheel 7 to turn therewith. In unrestrained condition, the belt 17 will run free, but it may be operatively connected to the grooved disk 18 by means of a grooved tension roller 19 journaled in the free end of the bracket 20 that is pivotally connected to and extends upwardly from one of the side bars 13 of the motor supporting framework. The bracket 20 is connected by means of a rod 21 with a handle lever 22, above the fulcrum point of the latter, so that by pulling rearwardly upon the hand lever 22 which is fulcrumed at convenient proximity to the driver's seat, the tension roller 19 may be caused to bear sufficiently against the belt 17 to effect a driving connection between the drive pulley 16 and the grooved disk 18, to turn the propulsion wheel 7 forwardly and cause a forward movement of the vehicle. A brake rod 24 is also connected to the hand lever 22 above the fulcrum of the latter and passes at its rear end through a sleeve 25 projecting upwardly from one of the side bars 9. The rear end of the brake rod 24 carries a brake shoe 26 located at the rear of the disk 18 and adapted to engage with the groove thereof. When the hand lever 22 is pushed forwardly, it will release the tension of the roller 19 upon the belt 17 and permit the motor to run free, while at the same time such forward movement will pull the brake rod 24 forwardly and effect the braking action of the shoe 26 with the disk 18 to bring the vehicle to a standstill.

The hand lever 22 is fulcrumed at its lower end upon a rod 27 which extends rearwardly from the lever and which is mounted to turn about its longitudinal axis in bearings 28 projected laterally from one of the side bars 9. The rear end of the rod 27 carries a bearing bracket 28* projecting both above and below the rod and formed at its ends with two journal bearings in which the substantially vertical shaft 30 is journaled. The shaft 30 carries an upper pulley 31 and a lower pulley 32 which are fast thereon and which are adapted to be alternately brought into frictional engagement with the outer face of the disk 18 according as the hand lever 22 is pulled towards the driver's seat to turn the rod 27, or away from the seat. The shaft 30 also carries a drum 33 around which the draft cables 34 and 35 are adapted to wind, one or the other, according to the direction in which the shaft 30 is turned. These cables are connected at their front ends, respectively, to hooks 36 which are in turn detachably engaged with hooks 37 clipped or otherwise secured to the front axle 5 preferably at the point where the shafts or thills are usually attached. Chain or rod links 38 are also connected at their front ends to the hooks 37 and converge rearwardly and are both secured to the front end of a compression spring 39. The rear end of this spring is connected by means of a hook 40 to a cross bar 41 which connects together the two hooks 10, extending from one to the other.

The tension of the spring 39 is such as to normally hold the front axle 5 straight. If it be desired to turn the vehicle to the right, the driver will push the hand lever 22 away from the driver's seat 6 and this will manifestly result in rotating the rod 27 in a direction to cause the lowermost pulley 32 to frictionally engage the face of the disk 18 and effect the rotation of the shaft 30 in a direction to wind up the right hand cable upon the drum 33 and turn the vehicle to the right. Conversely, if the driver draws the hand lever 22 towards the seat 6, the upper pulley 31 will frictionally engage the disk 18 and cause the vehicle to turn to the left.

From the foregoing description in connection with the accompanying drawings, it will be seen that I have provided a very simple, durable, light and efficient construction of motor attachment for the ordinary horse drawn vehicles, which will be comparatively cheap to manufacture, and which will, owing to the fact that only one propulsion wheel is employed at the middle of the rear axle of the vehicle, be able to travel along any road where the vehicle itself could go, or where a horse could draw it. As the propulsion means is of the unicycle type, that is, it employs a single traction wheel on which the attaching framework is balanced, it is evident that the weight of the motor will be to some extent at least balanced by the weight of the vehicle, and that the combined weight of the vehicle motor will cause the propulsion wheels 7 to secure a firm non-sliding contact with the roadway by which its propelling power will be utilized to the best possible advantage.

It is to be particularly noted that by my invention, a single hand lever in close proximity to the driver's seat, serves the manifold purpose of steering the vehicle to the right or to the left, of controlling the driving connection between the prime mover and the propulsion wheel and of braking the propulsion wheel with the same movement by which the connection between the prime mover and said wheel is rendered inoperative.

Having thus described the invention, what is claimed as new is:

1. A unicycle attachment for vehicles, comprising a single propulsion wheel adapted to travel along the road, a framework in which said wheel is journaled, means for connecting said framework with the rear axle of a vehicle, and a motor operatively connected to said wheel.

2. A unicycle motor attachment for vehicles, comprising a single propulsion wheel adapted to travel along the road, a framework in which said wheel is journaled, means for connecting said framework with the rear axle of a vehicle, a single traveling propulsion wheel journaled in said framework, a motor operatively connected to said wheel, steering mechanism, and means for driving said steering mechanism from the propulsion wheel.

3. The combination of a vehicle, of a supporting framework connected to the rear axle thereof, a traveling propulsion wheel mounted in said framework, a motor mounted on the framework, a disk secured to said wheel and movable therewith, a belt connecting the motor with the said disk, a hand lever, a support on the framework upon which said lever is fulcrumed in a position in advance of the framework and in proximity to the driver's seat of the vehicle, and means operatively connected to said hand lever for controlling the driving connection between said motor and said disk.

4. The combination with a vehicle, of a framework secured to the rear axle thereof, a motor supported on said framework, a traveling propulsion wheel journaled in said framework in the rear axle of the vehicle, a disk movable with the propulsion wheel, and operatively connected with the motor so as to propel said wheel, steering cables connected to the front axle of the vehicle, a drum upon which said cables are adapted to alternately wind, a shaft on which said drum is secured, friction pulleys secured on said shaft and adapted to alternately engage the face of the disk whereby to turn the shaft in one direction or the other, a rocking support in which said shaft is journaled, said support including a forwardly extending rod mounted in bearings in the framework and adapted to turn about its longitudinal axis, and a hand lever fulcrumed on said rod and adapted to turn the same.

5. The combination with a vehicle, of a propulsion device connected to the rear axle thereof and mounted in the rear of the vehicle, said propulsion device including a traveling propulsion wheel, and a motor adapted to drive said wheel, a friction disk movable with the propulsion wheel, a vertically extending shaft, upper and lower friction pulleys carried on said shaft, a bracket in which said shaft is journaled, a rod journaled to turn about its longitudinal axis in the framework, and extending forwardly thereof, a hand lever connected to said rod and adapted to turn the same, a drum mounted on said shaft, steering cables adapted to wind on said drum and connected to the opposite ends of the front of the vehicle, rearwardly converging links connected to the opposite ends of the axle, and a compression spring connected to the attachment and to said links.

6. The combination with a vehicle, of a framework connected to the rear axle, a traveling propulsion wheel journaled in said framework in the rear of the vehicle, a motor support on said framework and operatively connected to the propulsion wheel to drive the same, means for controlling the operative connection between said motor and the traveling wheel, said means including a hand lever, means for steering the vehicle, the steering means being actuated from the propulsion wheel and including the same hand lever, and means for braking the propulsion wheel, said braking means also including the same hand lever.

7. The combination with a vehicle, of a framework mounted in the rear thereof and embodying spaced side bars provided at their front ends with upwardly facing hooks adapted to take under the rear axle of the vehicle, springs secured to said hooks and extending over the axle, the said bars being provided with pins under which the said springs are adapted to be caught whereby to detachably connect the framework to the rear axle, a traveling propulsion wheel journaled in said framework, a motor supported on said framework and having a driving connection with said propulsion wheel, and means for controlling such connection.

8. The combination with a vehicle, of a framework mounted in the rear thereof and embodying spaced side bars provided at their front ends with upwardly facing hooks adapted to take under the rear axle of the vehicle, springs secured to said hooks and extending over the axle, the said bars being provided with pins, a motor supporting framework embodying side bars pivotally connected at their front ends to said pins and having a spring connection at their rear ends with the rear ends of the first named side bars, and means for controlling the connection between the motor and the propulsion wheel.

9. A motor attachment for vehicles comprising a supporting framework adapted to be coupled to the rear axle of the vehicle and extending rearwardly thereof, a traveling propulsion wheel journaled in said framework, a disk mounted to move with the propulsion wheel, a motor mounted on the framework, a belt connecting the motor shaft with the periphery of the disk and normally running loose, a tension device adapted to operatively connect said shaft to the motor and disk, a vertically extending shaft, upper and lower friction pulleys mounted on said shaft and adapted to be brought alternately into frictional engagement with the outer face of said disk, a bracket in which said vertical shaft is journaled, a rod mounted to turn about its longitudinal axis in said framework and extending forwardly thereof, a drum mounted on the vertical shaft, cables adapted to wind on said drum and connected to the front axle at opposite ends thereof, a hand lever fulcrumed on the said rod and adapted to turn the same so as to bring either one or the other of the frictional pulleys into operative relation with the disk, a brake shoe adapted to engage the disk, and rods connecting the tension device and the brake shoe with the hand lever.

In testimony whereof I affix my signature in presence of two witnesses.

EMORY HOPPER. [L. S.]

Witnesses:
CHAS. L. KANATZAR,
L. A. McTHOMPSON.